United States Patent
Wang et al.

(10) Patent No.: US 10,669,014 B2
(45) Date of Patent: Jun. 2, 2020

(54) DIFFERENTIAL FOR CONTROL SURFACE ACTUATORS

(71) Applicant: THE BOEING COMPANY, Chicago, IL (US)

(72) Inventors: Michael Chih-Huan Wang, Seattle, WA (US); Nathan A. Secinaro, Ann Arbor, MI (US)

(73) Assignee: THE BOEING COMPANY, Chicago, IL (US)

( * ) Notice: Subject to any disclaimer, the term of this patent is extended or adjusted under 35 U.S.C. 154(b) by 776 days.

(21) Appl. No.: 15/368,288

(22) Filed: Dec. 2, 2016

(65) Prior Publication Data

US 2018/0155053 A1 Jun. 7, 2018

(51) Int. Cl.

| B64C 13/34 | (2006.01) |
| F16H 48/08 | (2006.01) |
| F16H 1/16 | (2006.01) |
| F16H 25/22 | (2006.01) |
| F16H 1/28 | (2006.01) |
| F16H 48/20 | (2012.01) |
| F16H 37/12 | (2006.01) |

(52) U.S. Cl.
CPC ............... B64C 13/34 (2013.01); *F16H 1/16* (2013.01); *F16H 1/28* (2013.01); *F16H 25/2204* (2013.01); *F16H 37/12* (2013.01); *F16H 48/08* (2013.01); *F16H 48/20* (2013.01)

(58) Field of Classification Search
CPC .. B64C 9/00; B64C 9/30; B64C 13/00; B64C 13/24; B64C 13/28; B64C 13/34; B64C 13/341; B64D 2045/001
See application file for complete search history.

(56) References Cited

U.S. PATENT DOCUMENTS

| 2,696,954 | A | * | 12/1954 | Harmon | .................. | B64C 13/00 |
| | | | | | | 244/203 |
| 4,892,274 | A | * | 1/1990 | Pohl | ......................... | B64C 9/16 |
| | | | | | | 244/213 |
| 6,824,099 | B1 | * | 11/2004 | Jones | ...................... | B64C 13/28 |
| | | | | | | 244/99.12 |
| 7,494,094 | B2 | * | 2/2009 | Good | ....................... | B64C 3/50 |
| | | | | | | 244/215 |
| 10,179,643 | B2 | * | 1/2019 | Nfonguem | ............ | F16D 37/008 |
| 2006/0144996 | A1 | * | 7/2006 | Carl | ...................... | B64C 13/341 |
| | | | | | | 244/99.2 |
| 2008/0283672 | A1 | * | 11/2008 | Denzler | ............. | B64D 45/0005 |
| | | | | | | 244/213 |

(Continued)

FOREIGN PATENT DOCUMENTS

GB 679187 A * 9/1952 ............. B64C 13/00

*Primary Examiner* — Richard R. Green
*Assistant Examiner* — Michael A. Fabula
(74) *Attorney, Agent, or Firm* — Patterson + Sheridan, LLP (57) ABSTRACT

An actuation mechanism, a flap mechanism, and an aircraft. The actuation mechanism includes drive links and drive mechanisms connected to opposite ends of the flap that move the flap to various positions. The drive mechanisms are actuated by torque tubes connected to a drive motor via a differential. The differential distributes torque to the torque tubes. In the event of abnormal operation of one of the drive links or drive mechanisms, the differential limits torque to the remaining drive link and drive mechanism such that the flap does not deploy or retract in a skewed manner.

18 Claims, 8 Drawing Sheets

(56) References Cited

U.S. PATENT DOCUMENTS

| | | | |
|---|---|---|---|
| 2009/0302516 A1* | 12/2009 | Steele | B64C 13/341 |
| | | | 267/140.15 |
| 2010/0282899 A1* | 11/2010 | Heintjes | B64D 45/0005 |
| | | | 244/99.5 |
| 2012/0153085 A1* | 6/2012 | Good | B64C 9/20 |
| | | | 244/215 |
| 2014/0343784 A1* | 11/2014 | Brady | B64C 9/16 |
| | | | 701/29.1 |
| 2016/0355253 A1* | 12/2016 | Nfonguem | F16D 37/008 |
| 2017/0008614 A1* | 1/2017 | Tilly | B64C 13/0421 |
| 2017/0233095 A1* | 8/2017 | Baines | B64C 9/02 |
| | | | 244/99.3 |

* cited by examiner

DIFFERENTIAL FOR CONTROL SURFACE ACTUATORS

BACKGROUND

Flaps on aircraft are deployable to change lift characteristics of a wing for certain phases of flight. For example, flaps may be stowed during climb, cruise, and descent phases of flight, may be deployed to a first degree during a takeoff phase of flight, and may be deployed to a second, greater degree during a landing phase of flight. The flaps are typically pivotably connected to the wing of the aircraft at or close to a first inboard location and a second outboard location. The flaps are also typically actuated for deployment at the first and second locations.

Flap designs have trended toward stronger and more rigid flaps. Such stiffer flaps present a challenge with respect to detecting abnormal operations in the actuation mechanisms for one side of the flap.

SUMMARY

According to one aspect, an actuation mechanism for a movable control surface comprises a first drive link configured to connect to the movable control surface at a first location and a second drive link configured to connect to the movable control surface at a second location. Movement of the first and second drive links moves the movable control surface. The actuation mechanism also comprises a first torque tube operatively connected to a first drive mechanism. Rotation of the first torque tube actuates the first drive mechanism to move the first drive link. The actuation mechanism also comprises a second torque tube operatively connected to a second drive mechanism. Rotation of the second torque tube actuates the second drive mechanism to move the second drive link. The actuation mechanism also comprises a drive motor comprising a motor output shaft. The drive motor is operable to output a torque to the motor output shaft. The actuation mechanism also comprises a differential operatively connected to the motor output shaft, the first torque tube, and the second torque tube. The open differential is operable to distribute torque from the drive motor to the first torque tube and the second torque tube.

According to one aspect, an aircraft comprises a fuselage, a first wing, and a second wing. The aircraft also comprises a first flap mechanism disposed in the first wing. The first flap mechanism comprises a first flap arranged along a trailing edge portion of the first wing. The first flap is movable between a first position and a second position. The first flap mechanism also comprises a first drive link connected to the first flap at a first location and a second drive link connected to the first flap at a second location. Movement of the first and second drive links moves the first flap between the first position and the second position. The first flap mechanism also comprises a first torque tube operatively connected to a first drive mechanism. Rotation of the first torque tube actuates the first drive mechanism to move the first drive link. The first flap mechanism also comprises a second torque tube operatively connected to a second drive mechanism. Rotation of the second torque tube actuates the second drive mechanism to move the second drive link. The first flap mechanism also comprises a first drive motor comprising a first motor output shaft. The first drive motor is operable to output a torque to the first motor output shaft. The first flap mechanism also comprises a first differential operatively connected to the first motor output shaft, the first torque tube, and the second torque tube. The first differential is operable to distribute torque from the first drive motor to the first torque tube and the second torque tube. The aircraft also comprises a second flap mechanism disposed in the second wing. The second flap mechanism comprises a second flap arranged along a trailing edge portion of the second wing. The second flap is movable between the first position and the second position. The second flap mechanism also comprises a third drive link connected to the second flap at a third location and a fourth drive link connected to the second flap at a fourth location. Movement of the third and fourth drive links moves the second flap between the first position and the second position. The second flap mechanism also comprises a third torque tube operatively connected to a third drive mechanism. Rotation of the third torque tube actuates the third drive mechanism to move the third drive link. The second flap mechanism also comprises a fourth torque tube operatively connected to a fourth drive mechanism. Rotation of the fourth torque tube actuates the fourth drive mechanism to move the fourth drive link. The second flap mechanism also comprises a second drive motor comprising a second motor output shaft. The second drive motor is operable to output a torque to the second motor output shaft. The second flap mechanism also comprises a second differential operatively connected to the second motor output shaft, the third torque tube, and the fourth torque tube. The second differential is operable to distribute torque from the second drive motor to the third torque tube and the fourth torque tube.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, torque from a drive motor is transferred to opposing sides of an actuation mechanism for a control surface through a differential. The differential distributes the torque to the opposing sides of the actuation mechanism. In the event of abnormal operation of one side of the actuation mechanism, the differential stops the other side from further actuating and potentially damaging the actuation mechanism and/or the control surface.

Figure 1:
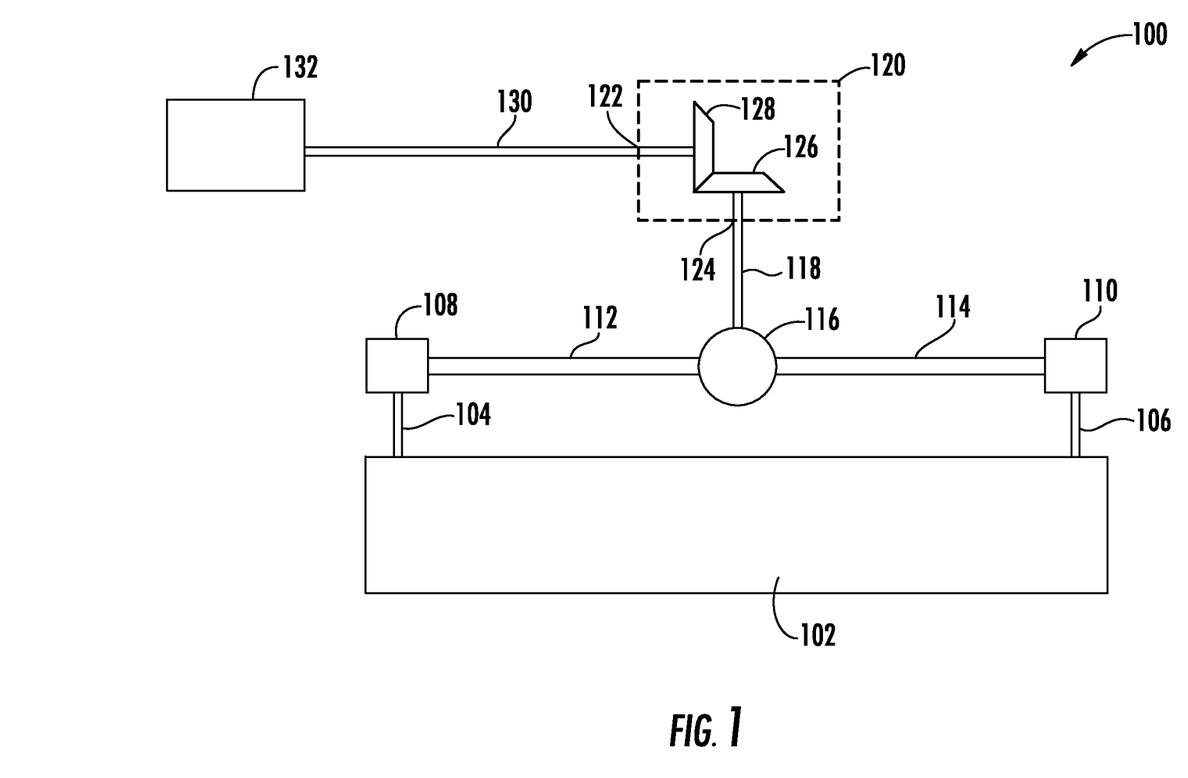
FIG. 1 is a block diagram of an actuation mechanism for a movable control surface, according to one aspect.

FIG. 1 is a top view block diagram of an actuation mechanism 100 for a movable control surface, such as a flap 102 for an aircraft, according to one aspect. The actuation mechanism 100 includes a first drive link 104 configured to be connected to the movable control surface at a first location and a second drive link 106 configured to be connected to the movable control surface of the second location. In the illustrated aspect, the first drive link 104 is configured to be connected to the movable control surface at an inboard location and the second drive link 106 is configured to be connected to the movable control surface at an outboard location. FIG. 1 illustrates the first drive link 104 and the second drive link 106 connected to the flap 102. As will be discussed in greater detail below with reference to FIGS. 3A, 3B, and 4, the first drive link 104 and the second drive link 106 could be a pushrod or a four bar linkage in certain aspects. The actuation mechanism 100 also includes a first torque tube 112 operatively connected to a first drive mechanism 108 and a second torque tube 114 operatively connected to a second drive mechanism 110. The first drive link 104 is operatively connected to the first drive mechanism 108 and the second drive link 106 is operatively connected to the second drive mechanism 110. Rotation of the first torque tube 112 actuates the first drive mechanism 108 to move the first drive link 104 and rotation of the second torque tube 114 actuates the second drive mechanism 110 to move the second drive link 106. FIGS. 5A-5D, discussed in greater detail below, describe exemplary drive mechanisms that could be used in different aspects.

The first drive mechanism 108 and the second drive mechanism 110 include no back mechanisms, which act like clutch packs. The no back mechanisms are designed to "slip" when the torque applied by the torque tube is greater than a critical cutoff value and lock when the applied torque is less than this critical cutoff value. The no back mechanisms lock the respective first drive mechanism 108 and second drive mechanism 110 unless the respective torque tubes 112 and 114 transmit more torque than the critical cutoff value. Such a no back mechanism prevents air loads (i.e., loads on the flap from air moving against the flap) from moving the flap 102 against the first and second drive mechanisms 108 and 110 and first and second drive links 104 and 106. In one aspect, the critical cutoff value is set to a torque value that is equal to or slightly higher than the air loads on the flap 102. As a result, the no back mechanisms keep the respective first drive mechanism 108 and second drive mechanism 110 locked until the torque transmitted by the torque tubes 112 and 114 to the respective drive mechanisms 108 and 110 overcomes the air loads on the flap 102.

The first torque tube 112 and the second torque tube 114 are operatively connected to a differential 116. In various aspects, the differential 116 may be an open differential, a limited slip differential, or a locking differential. The differential 116 is operatively connected to a drive motor 132, and distributes torque from a motor output shaft 130 of the drive motor 132 to the first torque tube 112 and to the second torque tube 114. The drive motor 132 may be an electric motor, a hydraulic motor, or a pneumatic motor.

In one aspect, the motor output shaft 130 of the drive motor 132 is directly connected to the differential 116. In other aspects, such as the aspect illustrated in FIG. 1, the motor output shaft 130 of the drive motor 132 is operatively connected to the differential 116 through a bevel gear assembly 120. The bevel gear assembly 120 includes an input 120 that receives the motor output shaft 130 of the drive motor 132 or that receives torque from the motor output shaft 130. The bevel gear assembly 120 also includes an output 124 that includes a bevel gear output shaft 118. The bevel gear output shaft 118 is connected to the differential 116 to transmit torque to the first torque tube 112 and the second torque tube 114. The bevel gear assembly 120 includes a first bevel gear 126 engaged with a second bevel gear 128 at an angle such that the bevel gear output shaft 118 is not parallel with the motor output shaft 130. In the illustrated aspect, the first bevel gear 126 and the second bevel gear 128 are configured such that the bevel gear output shaft 118 is orthogonal to the motor output shaft 132. In other aspects, the first bevel gear 126 and the second bevel gear 128 are configured such that the bevel gear output shaft 118 is arranged at a different nonparallel angle with respect to the motor output shaft 132.

As discussed above, the differential 116 allows actuation of control surface 102 to be stopped in the event of abnormal operation of certain portions of the actuation mechanism 100. For example, consider a first scenario in which the torque tube 112 fails (e.g., the torque tube 112 cracks). In such a scenario, no torque is transferred by the torque tube 112 from the differential 116 to the first drive mechanism 108. For aspects in which the differential 116 is an open differential, when the torque to the first torque tube 112 goes to zero, the torque transmitted to the second torque tube 114 also drops to zero. As a result, the flap 102 is not actuated in a skewed manner, meaning that the flap 112 is not actuated in an uncoordinated manner by only the second drive link 106. In aspects in which the differential 116 is a limited slip differential or a locking differential, the amount of torque transmitted to the second torque tube 114 before the differential begins to slip or unlocks may be less than the critical torque value of the no back mechanism of the second drive mechanism 110. Again, as a result, the flap 102 is not actuated in a skewed manner. In aspects in which such a limited slip differential or locking differential transmits a differential amount of torque in excess of critical torque value of the no back mechanism, then the differential 116 transmits torque to the second drive mechanism 110 via the second torque tube 114. The second drive mechanism 110 may move the second drive link 106 and the flap 102 in a skewed manner.

In the above-described scenarios in which the first torque tube 112 fails, the no-back mechanism in the first drive mechanism 108 locks the first drive link 104 in place, preventing any back driving of the first drive link 104 by the flap 102.

As another example, consider a second scenario in which the first drive link 104 experiences a failure (e.g., a push rod or four bar linkage breaks). In such a scenario, the amount of torque transferred by the torque tube 112 from the differential 116 is equal to the critical cutoff value for the no back mechanism in the first drive mechanism 108. Once the torque transmitted by the first torque tube 112 reaches the critical cutoff value for the no back mechanism in the drive mechanism 108, the no back mechanism unlocks the drive mechanism 108, but no additional torque from the first torque tube 112 is transmitted due to the failure of the first drive link 104. Again, for aspects in which the differential 116 is an open differential, an equal amount of torque, equal to the critical cutoff value, is transmitted to the second torque tube 114. As discussed above, the torque of the critical cutoff value is sufficient to unlock the first and second drive mechanisms 108 and 110, but is not sufficient to move the flap 102 against the air loads. As discussed above, the torque of the critical cutoff value may be slightly higher than the value of counter torque resulting from air loads on the flap 102. In this scenario in which the first drive link 104 has failed, the second drive link 106 has to apply approximately double the normal force (i.e., double the critical cutoff value for torque) to move the flap 102 against the air loads. Thus, even if the critical cutoff value of the no back mechanism is set higher than the counter torque from the air loads on the flap 102, the application of the critical cutoff value of torque through the second torque tube 114 to the second drive mechanism 110 will be insufficient to move the flap 102 against the air loads on the flap 102, due to the failure of the first drive link 104. As a result, the flap 102 is not actuated in a skewed manner.

As another example, consider a scenario in which the first drive mechanism 108 jams. In such a scenario, the torque transmitted by the first torque tube 112 will increase. It aspects in which the differential 116 is an open differential, the torque transmitted to the second torque tube 114 will also increase, resulting in skewing of the flap 102. However, as the torque transmitted by the first torque tube 112 increases, the first torque tube 112 will eventually fail. When the first torque tube 112 fails, the torque transmitted by the differential 116 to the first torque tube 112 drops to zero and, accordingly, the torque transmitted to the second torque tube 114 also drops to zero.

Figure 2:
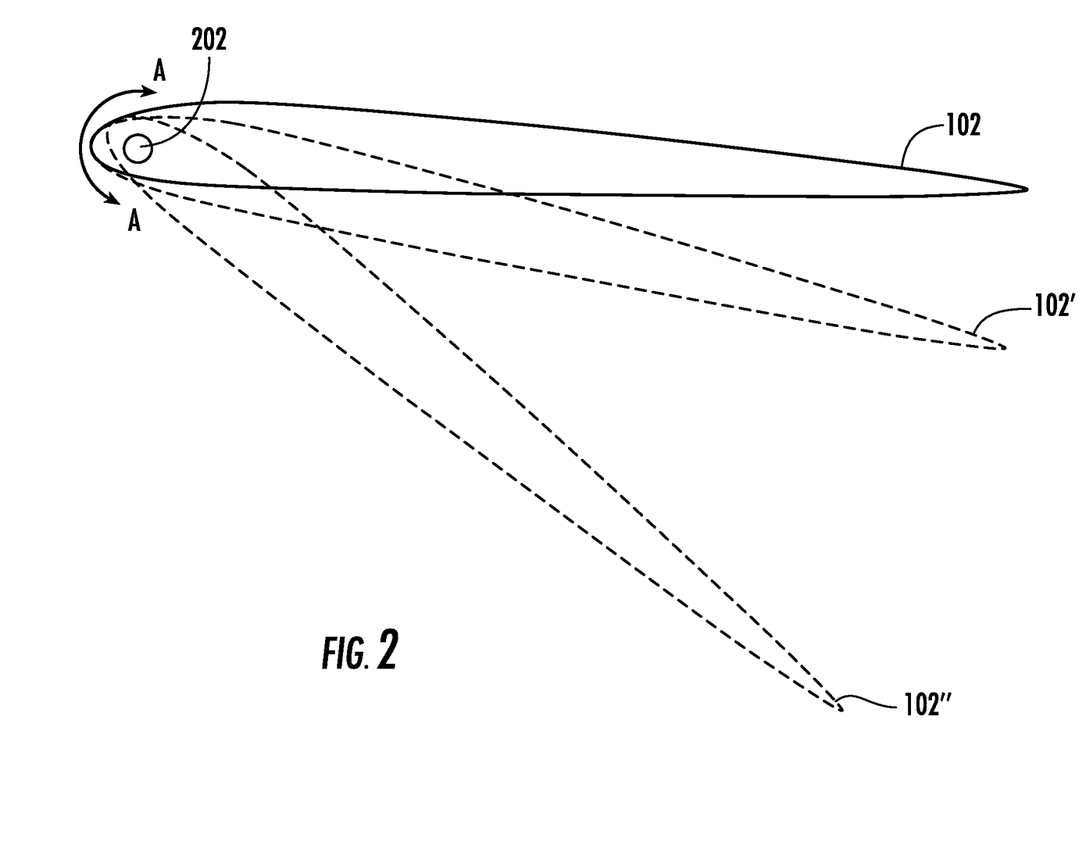
FIG. 2 is a side view of a flap illustrated in a first position, a second, deployed position, and a third, deployed position.

FIG. 2 is a side view of the flap 102 illustrated in an undeployed position, the flap 102' illustrated in a first deployed position (illustrated in broken line), and the flap 102" illustrated in a second deployed position (illustrated in second broken line). The flap 102 rotates in the direction of arrows A about a pivot 202 (e.g., a hinge or a shaft). The flap 102 may be in the undeployed position during climb, cruise, and descent phases of flight during which an aircraft typically flies at higher speeds. The flap 102' may be in the first deployed position during a takeoff phase of flight. The flap 102" may be in the second deployed position during approach and landing phases of flight.

Figure 3A:
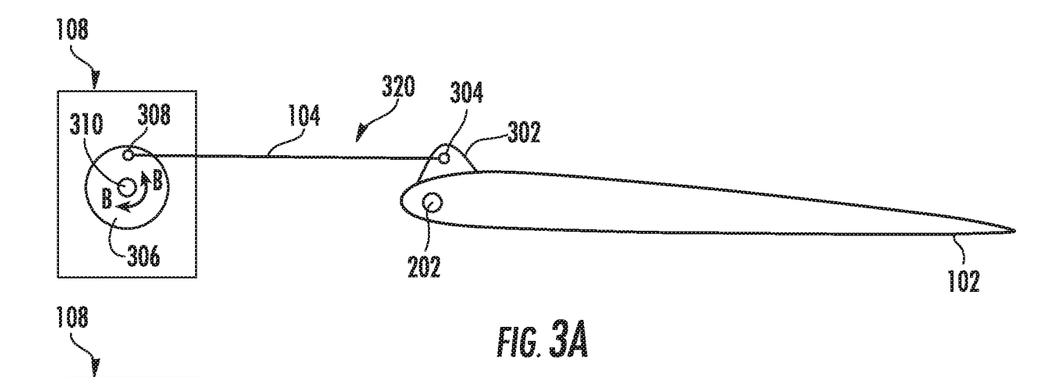
FIG. 3A is a side view of the flap of FIG. 2 coupled to a pushrod drive link and illustrated in the first position of FIG. 2.
Figure 3B:
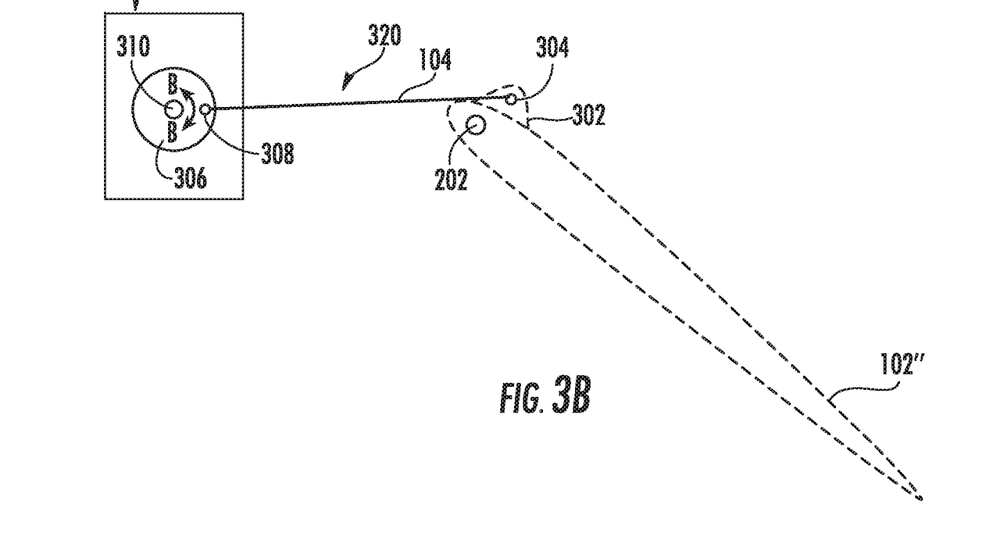
FIG. 3B is a side view of the flap of FIG. 2 coupled to the pushrod drive link of FIG. 3A and illustrated in the third, deployed position of FIG. 2.

FIGS. 3A and 3B are side views of the flap 102 connected to the first drive mechanism 108 and the first drive link 104. The flap 102 is similarly connected to the second drive mechanism 110 and second drive link 106. In the aspect illustrated in FIGS. 3A and 3B, the first drive link 104 comprises a pushrod 320. The flap 102 includes a flange 302 protruding there from. A first end of the pushrod 320 is pivotably connected to the flange 302 at a pivot 304. The drive mechanism 108 includes an output shaft 310 that rotates in the direction of arrows B. A crank 306 (e.g., a wheel or lever arm) is connected to and rotates with the output shaft 310. A second end of the pushrod 320 is pivotably connected to the crank 306 at a pivot 308. The crank 306 rotates in the direction of arrows B to move the pushrod 320 toward and away from the flange 302 on the flap 102. For example, the crank 306 rotates approximately 90° from the position shown in FIG. 3A to the position shown in FIG. 3B, which moves the pushrod 320 toward the flange 302. The movement of the pushrod 320 urges the flap 102 from the undeployed position shown in FIG. 3A to the second deployed position illustrated in FIG. 3B.

At least one aspect, the first drive mechanism 108 and the second drive mechanism 110 include gear reduction ratios such that multiple turns of the respective torque tubes 112 and 114 result in single turns of the output shafts 310. For example, in one aspect, the first drive mechanism 108 and the second drive mechanism 110 could have a gear reduction ratio of 1000:1, meaning that the torque tubes 112 and 114 rotate 1000 times for every rotation of the output shafts 310. Other suitable gear reduction ratios could be used in other aspects.

Figure 4:
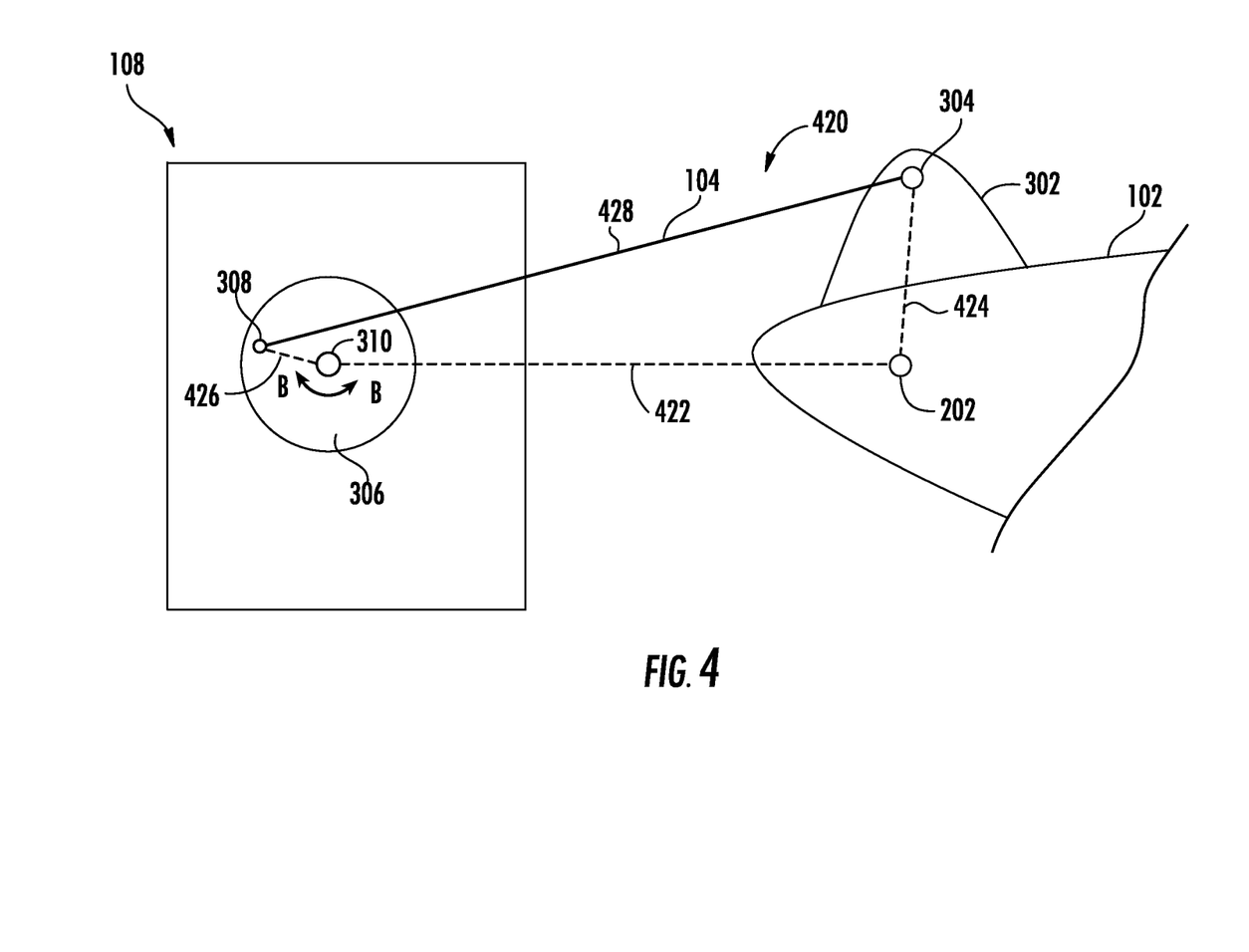
FIG. 4 is a side view of a portion of the flap of FIG. 2 coupled to a four bar linkage drive link.

FIG. 4 is a side view of the drive mechanism 108 and a portion of the flap 102, wherein the drive link 104 comprises a four bar linkage 420. In the illustrated aspect, one of the four "bars" of the four bar linkage 420 is virtual, defined by geometry of the drive mechanism 108 and the flap 102. Specifically, a first bar 422 of the four bar linkage 420 is defined by a distance between the output shaft 310 of the drive mechanism 108 and the pivot 202 of the flap 102 when the drive mechanism 108 and flap 102 are mounted in a wing of an aircraft, for example. A second bar 424 of the four bar linkage 420 is defined by a distance between the pivot 202 of the flap 102 and the pivot 304 on the flange 302 protruding from the flap 102. A third virtual bar 426 of the four bar linkage 420 is defined by a distance between the output shaft 310 of the drive mechanism 108 and the pivot 308 on a crank 306. The three bars 422, 424, and 426 of the four bar linkage 420 are illustrated in broken line. The fourth bar 428 of the four bar linkage 420 connects the pivot 304 of the flange 302 and the pivot 308 of the crank 306. In various aspects, the four bars of four bar linkage 420 are all "real", wherein the first bar 422, the second bar 424, and the third bar 426 are not co-located with the flap 102 and the crank 306 of the drive mechanism 108.

The four bar linkage 420 can be configured such that a complete rotation of the crank 306 in the direction of arrows B results in an oscillating motion of the flap 102. Specifically, if the third bar 426 of the four bar linkage 420 is shorter than the second bar 424 of the four bar linkage 420, then complete rotation of the crank 306 in the directions of arrows B results in the flap 102 moving back and forth between the undeployed position illustrated in FIG. 4 and the second deployed position illustrated in FIG. 2.

Figure 5A:
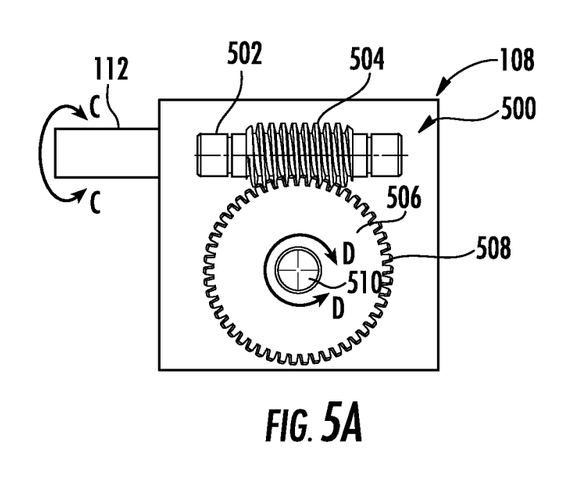
FIG. 5A is a block diagram of a drive mechanism that includes a worm gear.

FIGS. 5A-5D illustrate various aspects of the drive mechanism 108. The drive mechanism 110 can be similarly configured. In FIG. 5A, the drive mechanism 108 includes a worm gear 500. The worm gear 500 includes a worm shaft 502 that is connected to the torque tube 112. The torque tube 112 and the worm shaft 502 rotate in the directions of arrows C. The worm shaft 502 includes a helical thread 504 there-around. The helical thread 504 engages teeth 508 of a gear 506, and the gear 506 is connected to an output shaft 510 (e.g., the output shaft 310 referred to in FIGS. 3A, 3B, and 4. Rotation of the torque tube 112 and the worm shaft 502 causes the gear 506 to rotate in the direction of arrows D. Rotation of the gear 506 results in rotation of the output shaft 510.

Figure 5B:
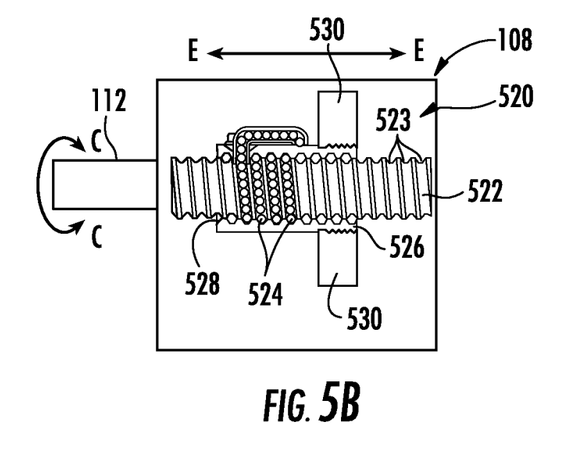
FIG. 5B is a block diagram of a drive mechanism that includes a ball screw.

In FIG. 5B, the drive mechanism 108 includes a ball screw 520. The ball screw 520 includes a shaft 522 with helical grooves 523 therein. A collar 526 with helical grooves 528 arranged in an interior cylindrical surface is arranged over the shaft 522. A plurality of balls 524 are arranged in a channel defined by the helical grooves 528 of the shaft 522 and the helical grooves 528 of the collar 526. The balls 524 act as a bearing between the shaft 522 and the collar 526. The shaft 522 is connected to the torque tube 112 such that rotation of the torque tube in the direction of arrows C results in rotation of the shaft 522. Rotation of the shaft 522 causes the collar 526 to move in the directions of arrows E. The collar 526 can be connected to an output arm 530 that also moves in the directions of arrows E. The output arm 530 could be connected to a pushrod (e.g., the pushrod 320 illustrated in FIGS. 3A and 3B) or to another drive link to urge the flap 102 between the undeployed position and the deployed positions.

Figure 5C:
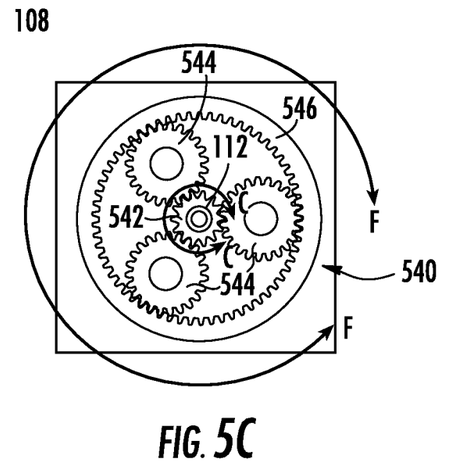
FIG. 5C is a block diagram of a drive mechanism that includes a planetary gear set.

In FIG. 5C, the drive mechanism 108 includes a planetary gear set 540. The planetary gear set 540 includes a sun gear 542 that is connected to the torque tube 112 such that the sun gear 542 rotates in the directions of arrows C with the torque tube 112. Teeth of the sun gear 542 engage teeth of planet gears 544 arranged there-around. The planet gears 544 are typically connected to each other by a carrier (not shown) that maintains the planet gears 544 in an angular arrangement about the sun gear 542. For example, in the aspect illustrated in FIG. 5C, the carrier maintains the planet gears 544 such that they are arranged 120° about the sun gear 542 from one another. In various aspects, the planetary gear set 540 may include more than three planet gears 544. For example, the planetary gear set 540 may include four planet gears 544 separated by 90° from one another or six planetary gears 544 separated by 60° from one another. The planet gears 544 engage teeth of a ring gear 546 arranged around the planet gears 544. The ring gear 546 is stationary, such that rotation of the sun gear 542 by the torque tube 112 in the direction of arrows C causes the planet gears 544 to rotate in an opposite direction in the direction of arrows F. The carrier for the planet gears 544 can be connected to an output shaft (e.g., the output shaft 310 illustrated in FIGS. 3A, 3B, and 4. In an alternative aspect, the sun gear 542 may be stationary. In such an aspect, the torque tube 112 may be connected to the carrier for the planet gears 544. Rotation of the carrier and the planet gears 544 in the direction of arrows C causes the ring gear 546 to rotate in the same direction in the direction of arrows F. In yet another aspect in which the sun gear 542 is stationary, the torque tube 122 may be connected to the ring gear 546. Rotation of the ring gear 546 in the direction of arrows C causes the planet gears 544 to rotate in the same direction in the direction of arrows F.

Figure 5D:
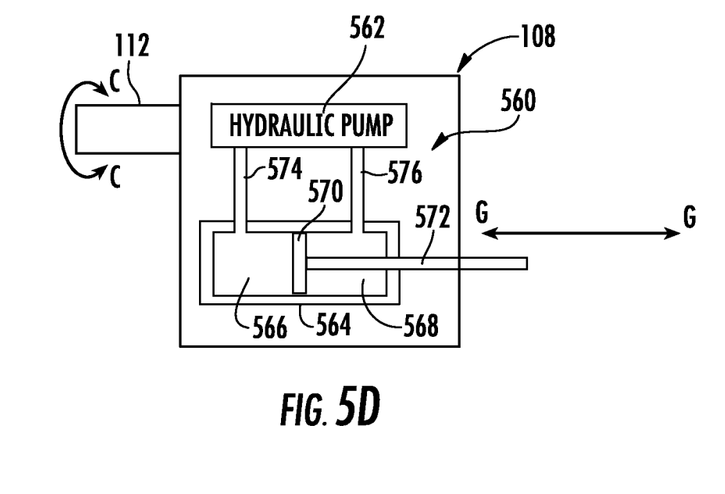
FIG. 5D is a block diagram of a drive mechanism that includes a hydraulic motor.

In FIG. 5D, the drive mechanism 108 is a hydraulic motor 560. The hydraulic motor 560 includes a hydraulic pump 562 that is connected to the torque tube 112. Rotation of the torque tube 112 in the directions of arrows C causes the hydraulic pump 562 two pump hydraulic fluid through the ports 574 and 576 into and out of a hydraulic cylinder 564. The hydraulic cylinder 564 includes a first chamber 566 and a second chamber 568 separated by a piston 570. The piston 570 is connected to a shaft 572, and the piston 570 and the shaft 572 are movable in the directions of arrows G. When the torque tube 112 is turned in a first direction, the hydraulic pump 562 pumps hydraulic fluid through the port 574 into the first chamber 566 and pumps hydraulic fluid out of the second chamber 568 through the port 576. As a result, the piston 570 and the shaft 572 are moved in a first direction along arrows G. When the torque tube 112 is turned in an opposite second direction, the hydraulic pump 562 pumps hydraulic fluid through the port 576 and the second chamber 568 and pumps hydraulic fluid out of the first chamber 566 through the port 574. As a result, the piston 570 and the shaft 572 are moved in an opposite second direction along arrows G. The shaft 572 can be connected to a drive link, such as the pushrod 320 illustrated in FIGS. 3A and 3B.

Figure 6:
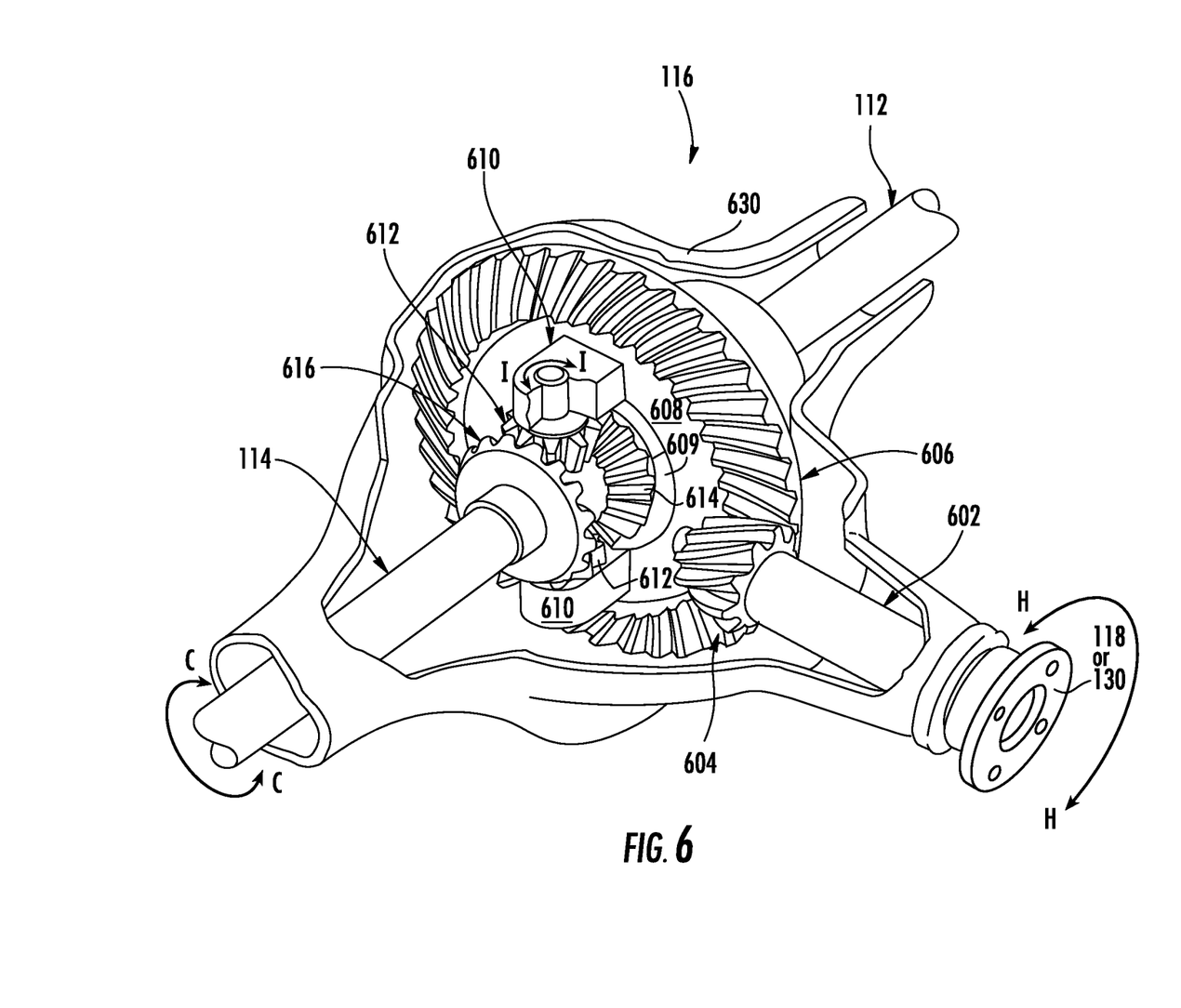
FIG. 6 is a perspective partial cutaway view of an open differential.

FIG. 6 is a perspective partial cutaway view of a differential 116 configured as an open differential. The differential 116 receives torque from the motor output shaft 130 or the bevel gear output shaft 118. The torque turns a pinion gear shaft 602 in the direction of arrows H. The pinion gear shaft 602 is connected to a pinion gear 604 that also rotates in the direction of arrows H. The pinion gear 604 engages teeth of a differential drive ring gear 606, which rotates in the direction of arrows C when the pinion gear 604 rotates in the direction of arrows H. The differential drive ring gear 606 includes an interior surface 608 with a central aperture 609 therethrough. Differential supports 610 protrude from the interior surface 608 of the differential drive ring gear 606 on opposite sides of the central aperture 609. The differential supports 610 rotatably support differential pinion gears 612, which face the aperture 609. The differential pinion gears 612 are coaxial with respect to one another and rotate in the directions of arrows I about the differential supports 610. Ends of the first and second torque tubes 112 and 114 opposite the first and second drive mechanisms 108 and 110 enter a housing 630 of the differential 116 and include differential side gears 614 and 616. The first torque tube 112 includes a first differential side gear 614 and the second torque tube 114 includes a second differential side gear 616. The first differential side gear 614 passes through the aperture 609 of the differential drive ring gear 606 to engage the differential pinion gears 612. The second differential side gear 616 also engages the differential pinion gears 612.

In operation, when the first and second torque tubes 112 and 114 are connected to the same loads, the pinion shaft 602 and pinion gear 604 turn the differential drive ring gear 606, which causes the differential supports 610 and the differential pinion gears 612 to rotate in the direction of arrows C. The differential pinion gears 612 rotate the first and second differential side gears 614 and 616 such that the first and second torque tubes 112 and 114 also rotate in the direction of arrows C. In the event the loads on the first and second torque tubes 112 and 114 are different, the differential 116 enables differential rotation of the first torque tube 112 and the second torque tube 114. For example, consider a situation in which the first torque tube 112 is under zero load (e.g., the above described scenario in which the first torque tube 112 has broken) and the second torque tube 114 is under a non-zero load. In such a scenario, the different loading causes the differential supports 610 and differential pinion gears 612 two rotate relative to the differential side gears 614 and 616 such that the torque from the motor output shaft 130 or from the bevel gear output shaft 118 is not transmitted to the first torque tube 112 or to the second torque tube 114.

A limited slip differential includes a clutch or similar structure that allows a limited amount of differential torque between the first torque tube 112 and the second torque tube 114 before the differential supports 610 and differential pinion gears 612 begin to rotate relative to the first and second differential side gears 614 and 616 and first and second torque tubes 112 and 114. A locking differential includes a clutch or similar structure that enables selective locking of the first torque tube 112 to the second torque tube 114 or selective locking of the first and second differential side gears 614 and 616. For example, the locking differential may selectively prevent the differential pinion gears 612 from rotating in the directions of arrows I within the differential supports 610 when in a locked state such that the differential drive ring gear 606, differential supports 610, differential pinion gears 612 and differential side gears 614 and 616 move together regardless of differential torque applied to the first torque tube 112 and the second torque tube 114. In an unlocked state, the differential pinion gears 612 rotate freely, as discussed above with respect to an open differential.

Figure 7:
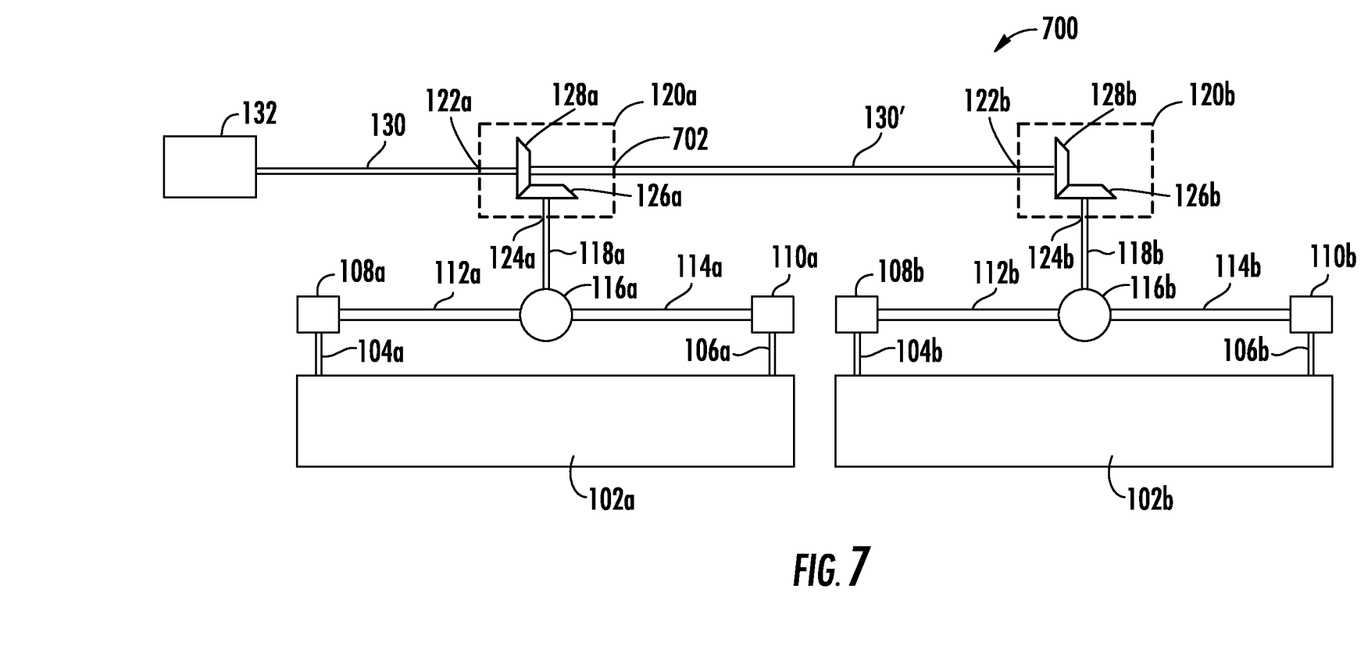
FIG. 7 is a block diagram of a flap mechanism for an aircraft, according to one aspect.

Referring again to FIG. 1, in at least one aspect, the actuation mechanism 100 includes the flap 102. The combination of the actuation mechanism 100 with the flap 102 is referred to herein as a flap mechanism. FIG. 7 is a block diagram of a flap mechanism 700 for an aircraft that comprises a first flap 102a and a second flap 102b. The first flap 102a is connected to a first drive link 104a and a second drive link 106a, which are actuatable by a first drive mechanism 108a and a second drive mechanism 110a, respectively. A first torque tube 112a is operatively connected to the first drive mechanism 108a and a second torque tube 114a is operatively connected to the second drive mechanism 110a. The first torque tube 112a and the second torque tube 114a are connected to a first differential 116a. The first differential 116a is operatively connected to a motor output shaft 130 of the drive motor 132 via a first bevel gear assembly 120a. The first bevel gear assembly 120a includes an input 122a that is coupled to the motor output shaft 130, an output 124a that includes a first bevel gear output shaft 118a, and bevel gears 126a and 128a therein.

The second flap 102b is connected to a third drive link 104b and a fourth drive link 106b, which are actuatable by a third drive mechanism 108b and a fourth drive mechanism 110b, respectively. A third torque tube 112b is operatively connected to the third drive mechanism 108b and a fourth torque tube 114b is operatively connected to the fourth drive mechanism 110b. The third torque tube 112b and the fourth torque tube 114b are connected to a second differential 116b. The second differential 116b is operatively connected to a motor output shaft 130' of the drive motor 132 via a second bevel gear assembly 120b. The second bevel gear assembly 120b includes an input 122b that is coupled to the motor output shaft 130, an output 124b that includes a second bevel gear output shaft 118b, and bevel gears 126b and 128b therein. The motor output shaft 130 may be a single shaft, and the bevel gear 128a in the first bevel gear assembly 120a may be arranged around the single shaft. Alternatively, the motor output shaft 130 may be a multi-piece shaft, wherein a first piece of the motor output shaft 130 is arranged between the drive motor 132 and the bevel gear 128a in the first bevel gear assembly 120a and wherein a second piece of the motor output shaft 130' is arranged between the bevel gear 128a in the first bevel gear assembly 120a and the bevel gear 128b in the second bevel gear assembly 120b. The first bevel gear assembly 120a includes a second output 702 that accommodates the motor output shaft 130' extending to the second bevel gear assembly 120b.

In operation, the drive motor 132 turns the motor output shaft 130 and 130', and the bevel gear assemblies 120a and 120b turn the respective bevel gear output shafts 118a and 118b. The first and second bevel gear output shafts 118a and 118b turn the first and second differentials 116a and 116b. The first and second differentials 116a and 116b turn the respective first, second, third, and fourth torque tubes 112a, 114a, 112b, and 114b. The first, second, third, and fourth torque tubes 112a, 114a, 112b, and 114b actuate the first, second, third, and fourth drive mechanisms 108a, 110a, 108b, and 110b to move the first, second, third, and fourth drive links 104a, 106a, 104b, and 106b and thereby move the first flap 102a and the second flap 102b. In the event of a failure in the actuation mechanism of one of the flaps, the other flap may continue to operate. For example, consider a scenario in which the first torque tube 112a fails. In such a scenario, the torque transmitted to both the first torque tube 112a and the second torque tube 114a from the first differential 116a will drop to zero. However, the drive motor 132 will still transmit torque to the second differential 116b such that the second flap 102b can continue to be moved.

Figure 8:
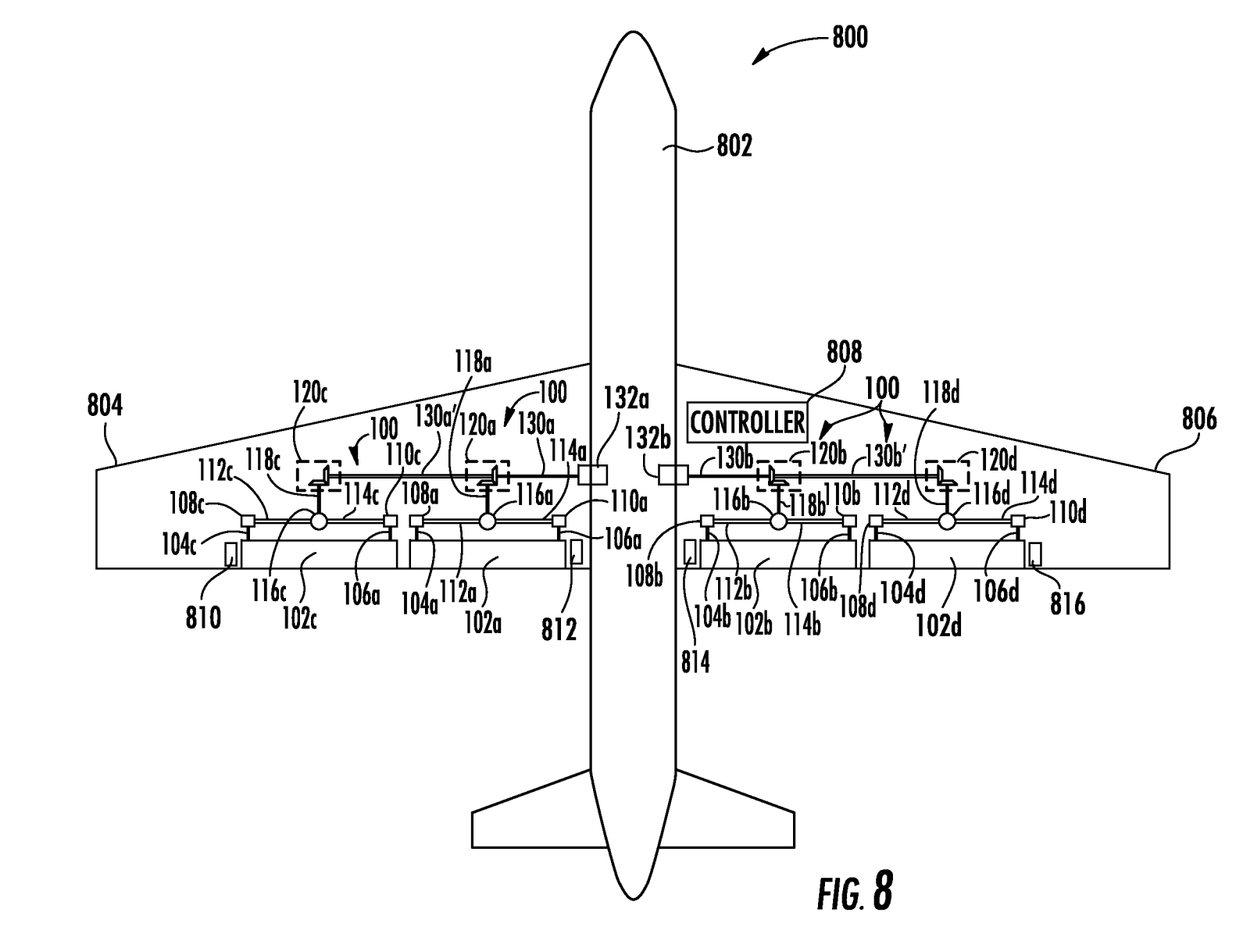
FIG. 8 is a block diagram of an aircraft, according to one aspect.

FIG. 8 is a block diagram of an aircraft 800 according to one aspect. The aircraft 800 includes a fuselage 802, a first wing 804 and a second wing 806. The first wing 804 and the second wing 806 are airfoils. The aircraft 800 includes a first flap 102a arranged along a trailing edge portion of the first wing 804 and a second flap 102b arranged along a trailing edge portion of the second wing 806. In the illustrated aspect, the aircraft 800 also includes a third flap 102c arranged along a trailing edge portion of the first wing 804 and outboard of the first flap 102a. The aircraft 800 also includes a fourth flap 102d arranged along a trailing edge portion of the second wing 806 and outboard of the second flap 102b. Each flap 102a, 102b, 102c, and 102d has an associated actuation mechanism 100. Specifically, the aspect illustrated in FIG. 8 includes a flap mechanism 700 associated with each wing.

With respect to the first wing 804, the first flap 102a includes a first actuation mechanism 100 that includes a first drive link 104a, a second drive link 106a, a first drive mechanism 108a, a second drive mechanism 110a, a first torque tube 112a, the second torque tube 114a, a first differential 116a, a first bevel gear assembly 120a, and a first bevel gear output shaft 118a, all of which operatively couple the first flap 102a to a motor output shaft 130a of a first drive motor 132a. With respect to the second wing 806, the second flap 102b includes a second actuation mechanism 100 that includes a third drive link 104b, a fourth drive link 106b, a third drive mechanism 108b, a fourth drive mechanism 110b, a third torque tube 112b, a fourth torque tube 114b, a second differential 116b, a second bevel gear assembly 120b, and a second bevel gear output shaft 118a, all of which operatively couple the second flap 102a to a motor output shaft 130b of a second drive motor 132b. Referring again to the first wing 804, the third flap 102c includes a third actuation mechanism 100 that includes a fifth drive link 104c, a sixth drive link 106c, a fifth drive mechanism 108c, a sixth drive mechanism 110c, a fifth torque tube 112c, a sixth torque tube 114c, a third differential 116c, a third bevel gear assembly 120c, and a third bevel gear output shaft 118c, all of which operatively couple the third flap 102c to the motor output shaft 130a' of the first drive motor 132a. Referring again to the second wing 806, the fourth flap 102c includes a fourth actuation mechanism 100 that includes a seventh drive link 104d, an eighth drive link 106d, a seventh drive mechanism 108d, an eighth drive mechanism 110d, a seventh torque tube 112d, an eighth torque tube 114d, a fourth differential 116d, a fourth bevel gear assembly 120d, and a fourth bevel gear output shaft 118d, all of which operatively couple the fourth flap 102d to the motor output shaft 130b' of the second drive motor 132b.

In operation, the flaps 102a, 102b, 102c, and 102d of the aircraft 800 are deployed in a synchronized manner. For example, the first flap 102a and second flap 102b deploy in a synchronized manner and the third flap 102c and the fourth flap 102d deploy in a synchronized manner. In at least one aspect, the aircraft 800 includes sensors that detect deployment positions of the flaps 102*a*, 102*b*, 102*c*, and 102*d*. For example, the aircraft can include a first sensor 812 that detects deployment positions of the first flap 102*a*, a second sensor 814 that detects deployment positions of the second flap 102*b*, a third sensor 810 that detects deployment positions of the third flap 102*c*, and a fourth sensor 816 that detects deployment positions of fourth flap 102*d*. The sensors 812, 814, 810, and 816 are in communication with a controller 808. In the event the actuation mechanism 100 for a particular one of the flaps fails, the controller 808 can stop the drive motors 132*a* and 132*b* to prevent unsynchronized motions of the flaps 102*a*, 102*b*, 102*c*, and 102*d*. For example, in a scenario in which it actuation mechanism 100 for the first flap 102*a* fails such that the first flap 102*a* does not deploy, as discussed above, the controller 808 can stop the first and second drive motors 132*a* and 132*b* to prevent further deployment of the flaps.

In at least one aspect, the bevel gear assemblies 120*a*, 120*b*, 120*c*, and 120*d* could include clutches that selectively engage and disengage the respective bevel gear output shafts 118*a*, 118*b*, 118*c*, and 118*d* from the motor output shafts 130*a*, 130*b*, 130*a'*, and 130*b'*, and the controller 808 controls actuation of the clutches. In the event one of the sensors 812, 814, 810, and 816 detects a lack of motion of its respective flap 102*a*, 102*b*, 102*c*, and 102*d*, the controller 808 can control clutches in the bevel gear assemblies 120*a*, 120*b*, 120*c*, and 120*d* to stop motion of the associated flap on the opposite wing. For example, suppose that the actuation mechanism 100 for the first flap 102*a* fails and the flap 102*a* does not deploy. The controller 808 could disengage a clutch in the second bevel gear assembly 120*b* such that the actuation mechanism 100 for the second flap 102*b* is disengaged from the motor output shaft 130*b* for the second motor 132*b*. As a result, the second flap 102*b* also would not deploy. Such a configuration would allow the outboard third flap 102*c* and fourth flap 102*d* to deploy, providing at least some of the lift benefits for the aircraft 800.

In a least one aspect in which the differentials 116*a*, 116*b*, 116*c*, and 116*d* are locking differentials, the controller 808 may control selection between a locked state and an unlocked state for the differentials 116*a*, 116*b*, 116*c*, and 116*d*.

With reference to FIG. 1, as discussed above, the drive mechanisms 108 and 110 can include gear reduction ratios. Such gear reduction ratios reduce the amount of motion of an output of the drive mechanisms 108 and 110 for a given number of rotations of the respective torque tubes 112 and 114. Such gear reduction ratios also multiply the torque output by the drive mechanisms 108 and 110 compared to the torque input into the drive mechanisms. For example, suppose a particular drive mechanism has a gear reduction ratio of 2:1 and a torque of 100 foot pounds is input to the drive mechanism. Ignoring friction losses, the output torque would be 200 foot pounds. As a result of such gear reduction, less input torque can be provided to achieve a particular output torque. Thus, the first and second torque tubes 112 and 114 can be made smaller as the gear reduction ratio of the drive mechanisms 108 and 110 increases because the first and second torque tubes 112 and 114 will transmit less torque. The differential 116 and, where applicable, the bevel gear assembly 120 can include additional gear reduction ratios. As a result, the bevel gear output shaft 118 and the motor output shaft 130 may also be made smaller. Additionally, the drive motor 132 may be made smaller because the torque requirements of the drive motor 132 decrease as the above-described gear reduction ratios increase.

The above-described actuation mechanism could be used with control surfaces other than flaps. For example, with respect to aircraft, the actuation mechanism could be used with other control surfaces such as ailerons, elevators, rudders, trim tabs, spoilers, and/or speed brakes. Other non-limiting examples of use of the actuation mechanism 100 in non-aviation applications include trim tabs and/or rudders for ships.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. An actuation mechanism for a movable control surface, the actuation mechanism comprising:
 a first drive link configured to connect to the movable control surface at a first location and a second drive link configured to connect to the movable control surface at a second location, wherein movement of the first and second drive links move the movable control surface;
 a first torque tube operatively connected to a first drive mechanism, wherein rotation of the first torque tube actuates the first drive mechanism to move the first drive link;
 a second torque tube operatively connected to a second drive mechanism, wherein rotation of the second torque tube actuates the second drive mechanism to move the second drive link;
 a drive motor comprising a motor output shaft, wherein the drive motor is operable to output a torque to the motor output shaft; and
 a differential operatively connected to the motor output shaft,
 wherein the first torque tube couples the differential to the first drive mechanism, and the second torque tube couples the differential to the second drive mechanism, wherein the differential is operable to distribute torque from the drive motor to the first torque tube and the second torque tube.

2. The actuation mechanism of claim 1, wherein the first drive link comprises a push rod, and wherein the second drive link comprises a push rod.

3. The actuation mechanism of claim 1, wherein the first drive link comprises a four-bar linkage, and wherein the second drive link comprises a four-bar linkage.

4. The actuation mechanism of claim 1, wherein the first drive mechanism comprises one of a worm gear, a ball screw, a planetary gear set, and a hydraulic motor; and wherein the second drive mechanism comprises one of a worm gear, a ball screw, a planetary gear set, and a hydraulic motor.

5. The actuation mechanism of claim 1, wherein the drive motor is one of an electric motor and a hydraulic motor.

6. The actuation mechanism of claim 1, further comprising a bevel gear assembly arranged between the motor output shaft of the drive motor and the differential, wherein an input of the bevel gear assembly is coupled to the motor output shaft of the drive motor, and wherein an output of the bevel gear assembly comprises a bevel gear output shaft coupled to the differential, and wherein the bevel gear output shaft is not parallel with the motor output shaft.

7. The actuation mechanism of claim 1, wherein the differential is an open differential operable to distribute equal amounts of torque from the drive motor to the first torque tube and the second torque tube.

8. The actuation mechanism of claim 1, wherein the differential is a limited slip differential operable to different amounts of torque from the drive motor to the first torque tube and the second torque tube up to a predetermined threshold difference.

9. The actuation mechanism of claim 1, wherein the differential is a locking differential that includes a locked state and an unlocked state, wherein the differential distributes equal amounts of torque from the drive motor to the first torque tube and the second torque tube in the unlocked state, and wherein the differential distributes half of the torque from the drive motor to the first torque tube and half of the torque from the drive motor to the second torque tube in the locked state.

10. A flap mechanism for an aircraft, comprising:
a first flap for arrangement along a trailing edge portion of an airfoil, wherein the first flap is movable between a first position and a second position;
a first drive link connected to the first flap at a first location and a second drive link connected to the first flap at a second location, wherein movement of the first and second drive links move the first flap between the first position and the second position;
a first torque tube operatively connected to a first drive mechanism, wherein rotation of the first torque tube actuates the first drive mechanism to move the first drive link;
a second torque tube operatively connected to a second drive mechanism, wherein rotation of the second torque tube actuates the second drive mechanism to move the second drive link;
a drive motor comprising a motor output shaft, wherein the drive motor is operable to output a torque to the motor output shaft;
a first differential operatively connected to the motor output shaft, the first torque tube, and the second torque tube, wherein the first differential is operable to distribute torque from the drive motor to the first torque tube and the second torque tube;
a second flap for arrangement along a trailing edge portion of the airfoil outboard of the flap, wherein the second flap is movable between the first position and the second position;
a third drive link configured to be connected to the second flap at a third location and a fourth drive link configured to be connected to the second flap at a fourth location, wherein movement of the third and fourth drive links move the second flap between the first position and the second position;
a third torque tube operatively connected to a third drive mechanism, wherein rotation of the third torque tube actuates the third drive mechanism to move the third drive link;
a fourth torque tube operatively connected to a fourth drive mechanism, wherein rotation of the fourth torque tube actuates the fourth drive mechanism to move the fourth drive link; and
a second differential operatively connected to the motor output shaft, the third torque tube, and the fourth torque tube, wherein the second differential is operable to distribute torque from the drive motor 132 to the third torque tube and the fourth torque tube.

11. The flap mechanism of claim 10, wherein the first differential is operatively coupled to the motor output shaft by a first bevel gear assembly, and wherein the second differential is operatively coupled to the motor output shaft by a second bevel gear assembly.

12. An aircraft, comprising:
a fuselage;
a first wing and a second wing;
a first flap mechanism disposed in the first wing, the first flap mechanism comprising:
a first flap arranged along a trailing edge portion of the first wing, wherein the first flap is movable between a first position and a second position;
a first drive link connected to the first flap at a first location and a second drive link connected to the first flap at a second location, wherein movement of the first and second drive links move the first flap between the first position and the second position;
a first torque tube operatively connected to a first drive mechanism, wherein rotation of the first torque tube actuates the first drive mechanism to move the first drive link;
a second torque tube operatively connected to a second drive mechanism, wherein rotation of the second torque tube actuates the second drive mechanism to move the second drive link;
a first drive motor comprising a first motor output shaft, wherein the first drive motor is operable to output a torque to the first motor output shaft; and
a first differential operatively connected to the first motor output shaft, the first torque tube, and the second torque tube, wherein the first differential is operable to distribute torque from the first drive motor to the first torque tube and the second torque tube;
a second flap mechanism disposed in the second wing, the second flap mechanism comprising:
a second flap arranged along a trailing edge portion of the second wing, wherein the second flap is movable between the first position and the second position;
a third drive link connected to the second flap at a third location and a fourth drive link connected to the second flap at a fourth location, wherein movement of the third and fourth drive links move the second flap between the first position and the second position;
a third torque tube operatively connected to a third drive mechanism, wherein rotation of the third torque tube actuates the third drive mechanism to move the third drive link;
a fourth torque tube operatively connected to a fourth drive mechanism, wherein rotation of the fourth torque tube actuates the fourth drive mechanism to move the fourth drive link;
a second drive motor comprising a second motor output shaft, wherein the second drive motor is operable to output a torque to the second motor output shaft; and
a second differential operatively connected to the second motor output shaft, the third torque tube, and the fourth torque tube, wherein the second differential is operable to distribute torque from the second drive motor to the third torque tube and the fourth torque tube;

a third flap mechanism disposed in the first wing, the third flap mechanism comprising:
- a third flap arranged along a trailing edge portion of the first wing outboard of the first flap, wherein the third flap is movable between the first position and the second position;
- a fifth drive link connected to the third flap at a fifth location and a sixth drive link connected to the third flap at a sixth location, wherein movement of the fifth and sixth drive links move the third flap between the first position and the second position;
- a fifth torque tube operatively connected to a fifth drive mechanism, wherein rotation of the fifth torque tube actuates the fifth drive mechanism to move the fifth drive link;
- a sixth torque tube operatively connected to a sixth drive mechanism, wherein rotation of the sixth torque tube actuates the sixth drive mechanism to move the sixth drive link; and
- a third differential operatively connected to the first motor output shaft, the fifth torque tube, and the sixth torque tube, wherein the third differential is operable to distribute torque from the first drive motor to the fifth torque tube and the sixth torque tube; and a fourth flap mechanism disposed in the second wing, the fourth flap mechanism comprising:
- a fourth flap arranged along a trailing edge portion of the second wing outboard of the second flap, wherein the fourth flap is movable between the first position and the second position;
- a seventh drive link connected to the fourth flap at a seventh location and a eighth drive link connected to the fourth flap at an eighth location, wherein movement of the seventh and eighth drive links move the fourth flap between the first position and the second position;
- a seventh torque tube operatively connected to a seventh drive mechanism, wherein rotation of the seventh torque tube actuates the seventh drive mechanism to move the seventh drive link;
- an eighth torque tube operatively connected to an eighth drive mechanism, wherein rotation of the eighth torque tube actuates the eighth drive mechanism to move the eighth drive link; and
- a fourth differential operatively connected to the second motor output shaft, the seventh torque tube, and the eighth torque tube, wherein the fourth differential is operable to distribute torque from the second drive motor to the seventh torque tube and the eighth torque tube.

13. The aircraft of claim 12, further comprising a first sensor operable to detect positions of the first flap and a second sensor operable to detect positions of the second flap, and a controller operable to output an alarm upon the detected positions of the first and second flaps differing by more than a threshold amount.

14. The aircraft of claim 13, wherein the controller is further operable to stop the first and second drive motors upon outputting the alarm.

15. The aircraft of claim 12, wherein the first drive link comprises a push rod, wherein the second drive link comprises a push rod, wherein the third drive link comprises a push rod, and wherein the fourth drive link comprises a push rod.

16. The aircraft of claim 12, wherein the first drive link comprises a four-bar linkage, wherein the second drive link comprises a four-bar linkage, wherein the third drive link comprises a four-bar linkage, and wherein the fourth drive link comprises a four-bar linkage.

17. The aircraft of claim 12, wherein the first drive mechanism comprises one of a worm gear, a ball screw, a planetary gear set, and a hydraulic motor; wherein the second drive mechanism comprises one of a worm gear, a ball screw, a planetary gear set, and a hydraulic motor; wherein the third drive mechanism comprises one of a worm gear, a ball screw, a planetary gear set, and a hydraulic motor; and wherein the fourth drive mechanism comprises one of a worm gear, a ball screw, a planetary gear set, and a hydraulic motor.

18. The aircraft of claim 12, wherein the first differential is operatively coupled to the first motor output shaft by a first bevel gear assembly, wherein the second differential is operatively coupled to the second motor output shaft by a second bevel gear assembly, wherein the third differential is operatively coupled to the first motor output shaft by a third bevel gear assembly, and wherein the fourth differential is operatively coupled to the second motor output shaft by a fourth bevel gear assembly.

* * * * *

UNITED STATES PATENT AND TRADEMARK OFFICE
CERTIFICATE OF CORRECTION

PATENT NO. : 10,669,014 B2
APPLICATION NO. : 15/368288
DATED : June 2, 2020
INVENTOR(S) : Michael Chih-Huan Wang et al.

It is certified that error appears in the above-identified patent and that said Letters Patent is hereby corrected as shown below:

In the Claims

In Column 14, Line 4, in Claim 10, after "motor" delete "132".

Signed and Sealed this
Seventh Day of February, 2023

Katherine Kelly Vidal
*Director of the United States Patent and Trademark Office*